US012773981B2

(12) United States Patent
Anandhu et al.

(10) Patent No.: US 12,773,981 B2
(45) Date of Patent: Oct. 27, 2026

(54) STABILIZATION CONTROL SYSTEM AND A METHOD TO CONTROL THE CONTROL SYSTEM THEREOF

(71) Applicant: TVS MOTOR COMPANY LIMITED, Chennai (IN)

(72) Inventors: Suresh Anandhu, Chennai (IN); Sharma Abhishek, Chennai (IN); Manoharan Santhosh, Chennai (IN); Mohan Barath, Chennai (IN); Venkata Manga Raju Karnam, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 650 days.

(21) Appl. No.: 18/005,228

(22) PCT Filed: Jul. 28, 2021

(86) PCT No.: PCT/IN2021/050730
§ 371 (c)(1),
(2) Date: Jan. 12, 2023

(87) PCT Pub. No.: WO2022/024142
PCT Pub. Date: Feb. 3, 2022

(65) Prior Publication Data

US 2023/0264685 A1 Aug. 24, 2023

(30) Foreign Application Priority Data

Jul. 28, 2020 (IN) ............................ 202041032400

(51) Int. Cl.
*B60W 30/02* (2012.01)
*B60W 40/08* (2012.01)
(Continued)

(52) U.S. Cl.
CPC ............ *B60W 30/02* (2013.01); *B60W 40/08* (2013.01); *B60W 40/112* (2013.01); *B62J 45/415* (2020.02); *B60W 2300/36* (2013.01)

(58) Field of Classification Search
CPC .... B60W 30/02; B60W 40/08; B60W 40/112; B60W 2300/36; B62J 45/415; B62J 45/41; B62J 45/4151; B62J 27/00
See application file for complete search history.

(56) References Cited

U.S. PATENT DOCUMENTS 6,805,362 B1 * 10/2004 Melcher ............ B60G 17/0165 280/86.757
2004/0035630 A1 * 2/2004 Lich ................. B60R 21/01516 701/45
(Continued)

FOREIGN PATENT DOCUMENTS

EP 2026287 A2 * 2/2009 ............ G07C 5/085

OTHER PUBLICATIONS

Adams, Eric; Honda's Self-Balancing Motorcycle is Perfect for Noobs; 2017; wired.com; pp. 1-4 (Year: 2017).*
(Continued)

*Primary Examiner* — Aniss Chad
*Assistant Examiner* — Chase L Cooley
(74) *Attorney, Agent, or Firm* — Osha Bergman Watanabe & Burton LLP

(57) ABSTRACT

A stabilization control system for a saddled vehicle including: a vehicle roll angle data unit including a predetermined roll angle of the vehicle; a comparator unit that is configured to receive inputs from the vehicle roll angle data unit and a feedback roll angle data unit and is configured to determine a difference roll angle data between the inputs from the vehicle roll angle data unit and the feedback roll angle data unit; a stabilization control unit that is configured to receive
(Continued)

the difference roll angle data from the comparator unit and is configured to enable an actuator driver based upon the difference roll angle data received; and one or more vehicle sensors that are configured to provide inputs to the stabilization control unit.

13 Claims, 7 Drawing Sheets

(51) Int. Cl.
*B60W 40/112* (2012.01)
*B62J 45/415* (2020.01)

(56) References Cited

U.S. PATENT DOCUMENTS

| | | | | |
|---|---|---|---|---|
| 2014/0188341 | A1 | 7/2014 | Takenaka et al. | |
| 2017/0327109 | A1* | 11/2017 | Watanabe | B60W 50/12 |
| 2021/0107573 | A1* | 4/2021 | Bailey | G05D 1/0891 |
| 2021/0269104 | A1* | 9/2021 | Brendelson | B62D 37/06 |
| 2022/0161766 | A1* | 5/2022 | Nose | B60T 7/22 |

OTHER PUBLICATIONS

International Search Report issued in corresponding International Application No. PCT/IN2021/050730 mailed Jan. 12, 2022 (5 pages).
Written Opinion issued in corresponding International Application No. PCT/IN2021/050730 mailed Jan. 12, 2022 (14 pages).

* cited by examiner

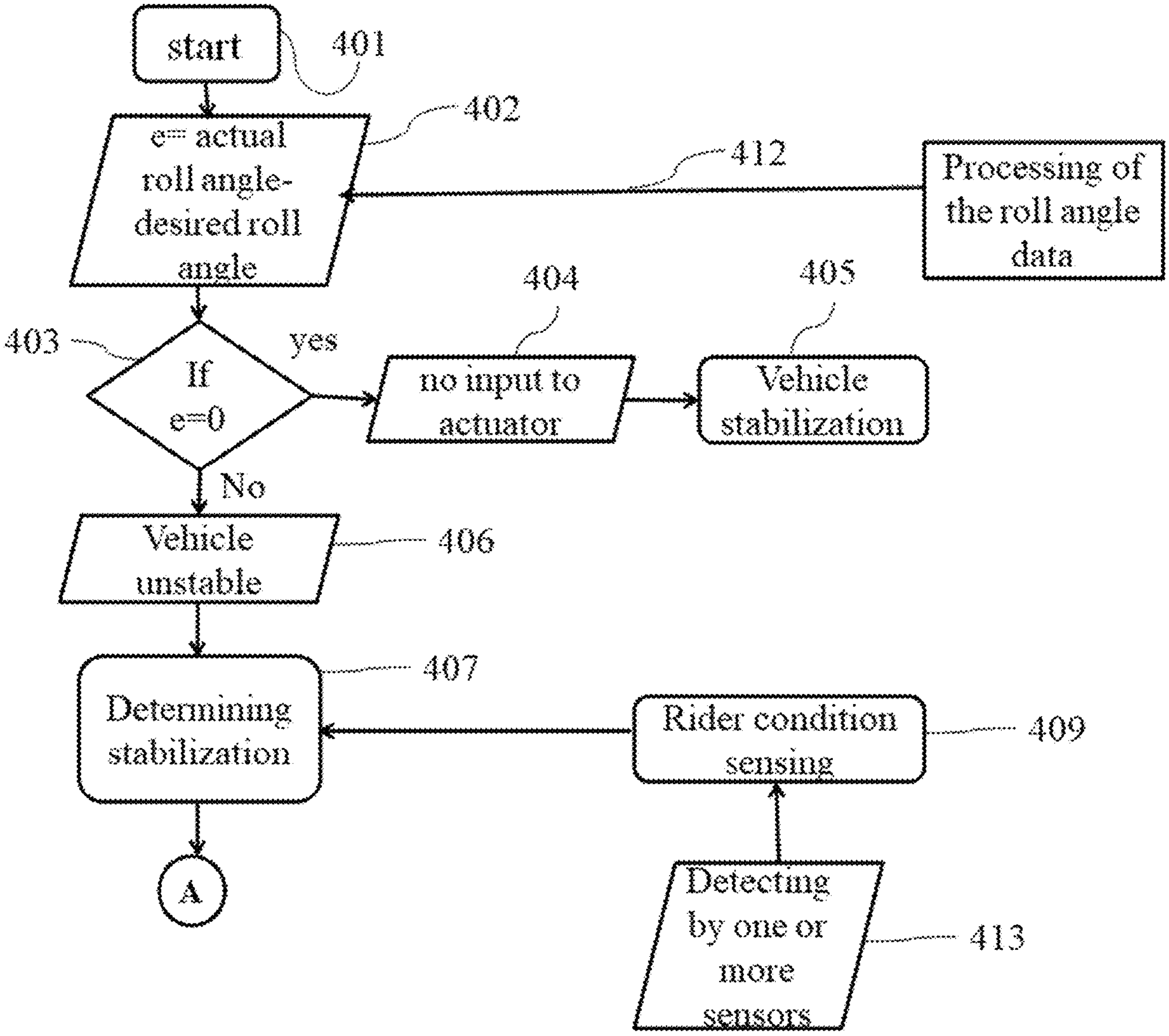
Figure 6 (Contd...)

STABILIZATION CONTROL SYSTEM AND A METHOD TO CONTROL THE CONTROL SYSTEM THEREOF

TECHNICAL FIELD

The present subject matter relates to a two-wheeled vehicle. More particularly but not exclusively, to a stabilization control system and a method to control the system thereof for balancing the vehicle using only two wheels.

BACKGROUND

The need for reliability on two-wheeled vehicles is increasing in developing countries. People rely more on two-wheelers for transportation. Furthermore, many users are unwilling or unable to operate motorcycles and scooters. Such users include senior members of the society, short-heighted persons, amateur riders and the like. These are the persons who are unable to balance the vehicle with two wheels by themselves due to the safety concerns in the event of crashes, and the skills required to maintain vehicle stability during vehicle use. Ideally, the two wheeled vehicles should be standing upright. However, there is always small amount of unbalanced weight on either the right-hand side or on the left-hand side of the vehicle. Because of which, the two-wheeled vehicle tends to lean either on the right-hand side or the left-hand side depending on the unbalanced weight on that respective side of the vehicle.

BRIEF DESCRIPTION OF THE DRAWINGS

The detailed description is described with reference to an embodiment of a saddle type two wheeled with accompanying figures. The same numbers are used throughout the drawings to reference like features and components.

DETAILED DESCRIPTION OF THE INVENTION

Figure 1:
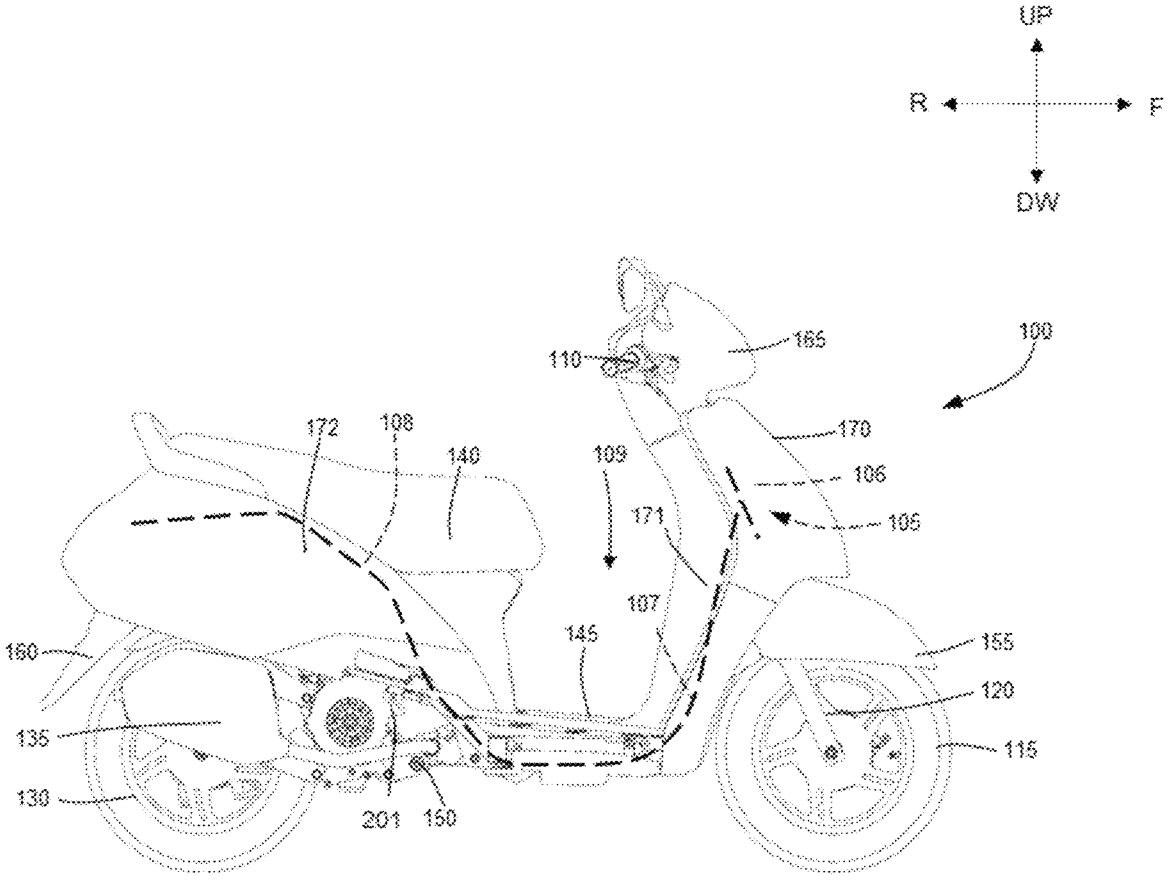
FIG. 1 depicts a side view of an exemplary two-wheeled vehicle 100, in accordance with an embodiment of the present subject matter.

A lot of accidents occur due to the instability of the two-wheeled vehicle along the roll direction, particularly at low speeds. People as mentioned earlier struggle to balance the two-wheeler when in traffic conditions. The difficulty in balancing the two-wheeler aggravates if the two-wheeler is heavy. A two-wheeler accident could be fatal to the users as well as damage to the vehicle. This poses a safety threat to the users of the two-wheeled vehicles.

The two-wheeler has an inherent instability in roll direction. This causes the vehicle to fall by itself at lower speed. It becomes increasingly difficult to balance a vehicle as the weight of the vehicle increases. Common people struggle in traffic due to this instability of two-wheeler.

In conventional two-wheelers, riders find it difficult to balance a two-wheeler at low speeds. To balance a two wheeled saddle vehicle, a rider is required to apply corrective steering torque to keep the vehicle from falling at extremely low speeds. This physical phenomenon is also applicable for a simple bicycle as well.

For the purpose of balancing the vehicles, self-balancing systems are known in the art. Most of the existing systems use multiple flywheels for balancing of the vehicle. In a known art, two gyroscopes are used in a two-wheeler to balance the vehicle. A control system controls the angle and speed of the gyroscopes based on the angle of tilt of the motorcycle. The system has a plurality of flywheels (Control Moment Gyroscopes—CMGs) and a motor driving the flywheel has three degrees of freedom to balance a two-wheeler.

In another known art, a control system is configured, where in, speed and angular position of the vehicle are taken as inputs, the speed and angular position of one of the flywheels is controlled to balance the motorcycle.

However, these known systems occupy enormous amount of space in the layout of the vehicle. In two-wheelers, any additional systems could make the vehicle look bulky and heavier. Furthermore, the existing systems are too complex and expensive.

However, a compact and easy to incorporate systems are desirable.

Furthermore, in a known art, some other systems use a front steering to balance the two-wheeler at lower speeds and stand still. These systems struggle to balance the vehicle in case of higher disturbing impulses. This type of system demands heavier control actuators. One existing system has a provision to increase castor of the vehicle for taking care of higher impulses and balance at standstill. This makes the system too complex and poses manufacturability issues as well as increasing the cost. These kinds of systems also require heavy motors at the steering mechanism of the two-wheeler. Other existing systems use expensive sensors and controllers for the roll angle estimation and balancing. Most known systems lead to a delayed stabilization of the vehicle. The delay is perceived by the rider, as a result, the rider is subjected to nervousness feeling and loss of confidence, which is undesirable.

Therefore, a cost-effective, simple and compact system for balancing the two-wheeled vehicle is desirable, which overcomes all the above stated problems and limitations as well as other problems of known art.

With the above objectives in view, the present invention discloses an improved control system for a two-wheeler. More specifically, the present subject matter discloses a stabilizing control system and a method to control the stabilizing control system thereof. The stabilizing control system provides an output in the form of a reaction torque opposite to the falling direction of the vehicle to prevent falling of the vehicle, thus rendering the two-wheeler stable in the roll direction.

It is an object of the present invention to provide the two-wheeler with a stabilization control system which provides a reaction torque to the vehicle to make it stable in roll direction, and stay upright even at lower speeds.

It is another objective of the present subject matter to have multiple modules for data acquisition, control and data conditioning, so that the control system behaves smoothly and is robust.

The present subject matter disclosed herein relates to a stabilized control system and a method to control the stabilized control system to provide stability to the two-wheeled vehicle in the roll direction. More specifically, the system uses inputs from inertial measurement units to estimate a roll angle and provide a calculated reaction torque to resist the falling of two-wheeler.

According to an embodiment of the present invention, the stabilization control system includes a vehicle roll angle data unit, a comparator, a self-stabilizing control unit, an actuator driver, an actuator and one or more sensors.

The vehicle roll data unit includes a predetermined roll angle of the vehicle. This is the roll angle that is desired to be achieved at that particular moment during vehicle running condition. The vehicle roll angle data is determined by a steering lean angle sensor and a vehicle speed sensor. The data from the steering lean angle sensor and the vehicle speed sensor is provided o the vehicle roll angle data unit, depending on which, the desired roll angle data is determined.

Further, the determined desired roll angle data from the vehicle roll angle data unit is sent to a comparator unit. The comparator unit compares the determined desired roll angle data with the feedback roll angle data received from the vehicle. The feedback roll angle data is detected by the one or more vehicle sensors. The feedback roll angle data is the real time roll angle of the vehicle.

Further, the comparator is configured to determine the difference between the desired roll angle data and the feedback roll angle data. The determined difference roll angle data is further sent to the self-stabilizing control unit. The self-stabilizing control unit is configured to process and determine the required input to be given to the actuator driver. The actuator driver is configured to drive the actuator.

For example, in particular, the output of the self-stabilizing control unit is in the form of pulse width modulation (PWM) waveform. The PWM output is required to enable the actuator driver, for example, a motor operating at 48V. In this particular embodiment, the actuator is, for example, a gimbal.

Considering an ideal case, if the feedback roll angle data received is equal to the desired vehicle roll angle data, then the self-stabilizing control unit does not provide any inputs for actuation of the actuator driver.

However, if the feedback roll angle data received differs from the desired vehicle roll angle data, then the comparator determines the difference roll angle data, which will be further processed by the self-stabilizing control unit.

In an embodiment, the self-stabilization control unit includes a vehicle input processing module and an actuator input processing module. The vehicle input processing module is configured to receive inputs from an actuator angle processing unit. The actuator angle processing unit is configured to include an actuator angle position sensor. In addition, the actuator angle processing unit also performs the functionality of keeping a check on the angular position of the actuator. After the maximum angular position of the actuator is achieved, the data is sent to the vehicle input processing unit. The vehicle input processing unit at this instance, does not allow further actuation of the actuator driver in order to control the actuator.

Further, the actuator angle inputs from the actuator angle position sensor is also provided to the actuator input processing module. The actuator input processing module is another comparator, which compares the actuator angle positions sensor inputs with a desired actuator angle input. The desired actuator angle input is always 0. Therefore, the self-stabilization control unit after considering the functionalities and outputs of the vehicle input processing module and the actuator input processing module, provides required input to the actuator driver.

In an embodiment, the self-stabilization control unit is configured to receive inputs from a rider condition sensing unit. The rider condition sensing unit includes a rider condition sensing sensor. This helps to determine if the reaction torque output provided by the actuator is sufficient for a single user seated on the vehicle, or the output required should be produced, that would be sufficient, depending on the presence of the weight of the pillion rider.

In another embodiment, the rider condition sensing unit includes a suspension stroke sensor, configured to determine the stroke length of a suspension assembly to determine if a rider is seated or a rider along with a pillion rider is seated on the vehicle.

The stabilization control system as described above is enabled even when there is a slight change in the roll angle of the vehicle. The user of the vehicle, is not allowed to feel the stabilization of the vehicle being taking place, as achieved by the system. Unlike, in other systems, where, there would be balancing of the vehicle occurring only after the vehicle has leaned above a particular angle. In such cases, the user of the vehicle can feel the oscillating of the vehicle. However, according to the present subject matter, the stabilization control system is instantaneously performing the self-stabilization within milliseconds, even under slight variations of the angle, in the roll direction of the vehicle. This is particularly essential during riding the vehicle in lower speeds, where the vehicle tends to lean in the roll direction of the vehicle. Therefore, the user of the vehicle is not put to inconvenience or stress of experiencing the oscillations of the vehicle along the roll direction, due to the self-balancing system.

According to an embodiment of the present invention, the one or more vehicle sensors are configured to provide inputs to said stabilization control unit. The actuator is configured to provide output reaction torque and enable stabilization of said vehicle.

According to an embodiment the one or more vehicle sensors include one or more accelerometers, one or more roll angle sensors, a suspension stroke sensor, an actuator angle position sensor.

The summary provided above explains the basic features of the invention and does not limit the scope of the invention. The nature and further characteristic features of the present invention will be made clearer from the following descriptions made with reference to the accompanying drawings. The present subject matter is further described with reference to accompanying figures. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 depicts a side view of an exemplary two-wheeled vehicle 100, in accordance with an embodiment of the present subject matter. The vehicle 100 has a frame assembly 105 (schematically shown with dotted lines) that includes a head tube 106, a main frame 107 extending rearwardly downward from the head tube 106. The main frame 107 may comprise one or more main tube(s), and a pair of rear tubes 108 extending inclinedly rearward from a rear portion of the main tube. In the present embodiment, the vehicle 100 includes a step-through portion 109 defined by the frame member 105 of the vehicle 100. However, the aspects of the present subject matter are not limited to the depicted layout of the vehicle 100.

Further, a handlebar assembly 110 is connected to a front wheel 115 through one or more front suspension(s) 120. A steering shaft (not shown) connects the handlebar assembly 110 to the front suspension(s) 120 and the steering shaft is rotatably journaled about the head tube 106. An internal combustion (IC) 201 is mounted to the frame member 105. The engine E may also include a traction motor either hub mounted or mounted adjacent to the IC engine. In the depicted embodiment, the engine E is disposed below at least a portion of the rear frame(s) 108. However, in an alternative embodiment, the power unit may be fixedly disposed towards front and below the main tube 107. The engine E is functionally connected to a rear wheel 130 through a transmission system (not shown). The vehicle may include one or more rear wheel(s). Also, the vehicle 100 includes an exhaust system that helps in dissipation of exhaust gasses from the IC engine. The exhaust system 200 includes a muffler 135 mounted to the vehicle 100. In the depicted embodiment, the muffler 135 is disposed towards one lateral side of the vehicle 100.

Further, the rear wheel 130 is connected to the frame member 105 through one or more rear suspension(s) (not shown). In the depicted embodiment, the engine E is swingably mounted to the frame member 105 through a toggle link 150 or the like. A seat assembly 140 is supported by the frame member 105 and is disposed rearward to the step-through portion 109.

Further, the vehicle 100 includes a front fender 155 covering at least a portion of the front wheel 115. In the present embodiment, a floorboard 145 is disposed at a step-through portion 109 and is supported by the main frame 107 and a pair of floor frames (not shown). The user can operate the vehicle 100 by resting feet on the floorboard 145, in a sitting position. In an embodiment, a fuel tank (not shown) is disposed below the seat assembly 140 and behind the utility box. A rear fender 160 is covering at least a portion of the rear wheel 135. The vehicle 100 comprises of plurality of electrical/electronic components including a headlight 165, a tail light (not shown), a battery (not shown), a transistor-controlled ignition (TCI) unit (not shown), an alternator (not shown), a starter motor (not shown). Further, the vehicle 100 may include a synchronous braking system, an anti-lock braking system.

The vehicle 100 comprises plurality of panels that include a front panel 170 disposed in an anterior portion of the head tube 106, a leg-shield 171 disposed in a posterior portion of the head tube 106. A rear panel assembly 172 includes a right-side panel and a left side panel disposed below the seat assembly 140 and extending rearward from a rear portion of the floorboard 145 towards a rear portion of the vehicle 100. The rear panel assembly 172 encloses a utility box disposed below the seat assembly 140. Also, the rear panel assembly 172 partially encloses the engine E. Also, the muffler 135 of the exhaust system is coupled to exhaust side of the IC engine and in an implementation the muffler 135 is disposed towards one lateral side of the vehicle 100.

Figure 2:
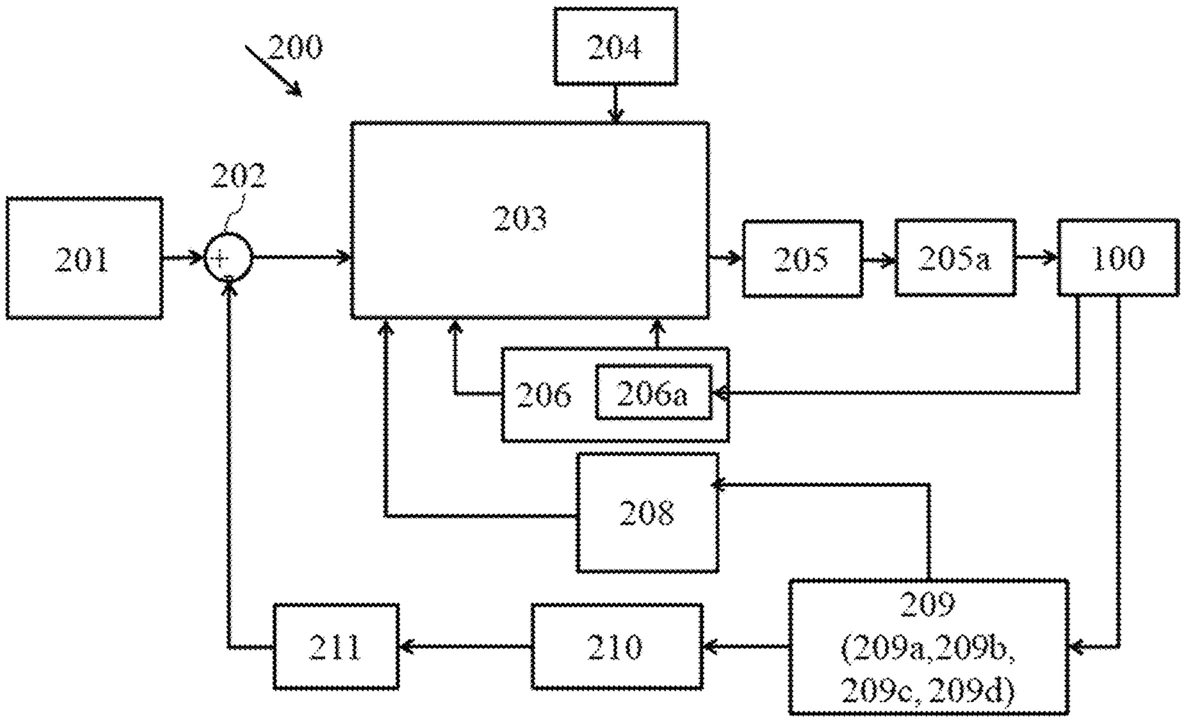
FIG. 2 illustrates a stabilized control system according to a first embodiment of the present subject-matter.

FIG. 2 illustrates a stabilization control system according to a first embodiment of the present subject-matter. The stabilization control system functions to move vehicle to provide a desired roll angle. If the desired roll angle is zero then the vehicle balances upright. FIG. 2 explains the basic schematic of the stabilization control system. The desired roll angle data is the initial input to the system. Then the vehicle input processing module take in the difference in the desired vehicle roll angle data and a feedback roll angle data which is feedback from the one or more vehicle sensors.

According to an embodiment of the present invention, the stabilization control system 200 includes a vehicle roll angle data unit 201, a comparator 202, a self-stabilizing control unit 203, an actuator driver 205, an actuator **205*a* and one or more sensors 209**.

The vehicle roll angle data unit 201 includes a predetermined roll angle of the vehicle. This is the roll angle that is desired to be achieved at that particular moment during vehicle running condition. The vehicle roll angle data is determined by a steering lean angle sensor and a vehicle speed sensor. The data from the steering lean angle sensor and the vehicle speed sensor is provided to the vehicle roll angle data unit 201, depending on which, the desired roll angle data is determined.

Further, the determined desired roll angle data from the vehicle roll angle data unit 201 is sent to a comparator unit 202. The comparator unit 202 compares the determined desired roll angle data with the feedback roll angle data provided by the feedback roll angle data unit 210, that is received from the vehicle. The feedback roll angle data is detected by the one or more vehicle sensors 209. The feedback roll angle data is the real time on instantaneous roll angle of the vehicle 100.

Further, the comparator 202 is configured to determine the difference between the desired roll angle data and the feedback roll angle data. The determined difference roll angle data is further sent to the self-stabilizing control unit 203. The self-stabilizing control unit 203 is configured to process and determine the required input to be given to the actuator driver 205. The actuator driver 205 is configured to drive the actuator **205*a***.

For example, in particular, the output of the self-stabilizing control unit 203 is in the form of pulse width modulation (PWM) waveform. The PWM output is required to enable the actuator driver 205, for example, a motor operating at 48V. In this particular embodiment, the actuator **205*a*** is, for example, a gimbal.

Considering an ideal case, if the feedback roll angle data received is equal to the desired vehicle roll angle data, then the self-stabilizing control unit 203 does not provide any inputs for actuation of the actuator driver 205.

However, if the feedback roll angle data received differs from the desired vehicle roll angle data, then the comparator 202 determines the difference roll angle data, which will be further processed by the self-stabilizing control unit 203.

Figure 3:
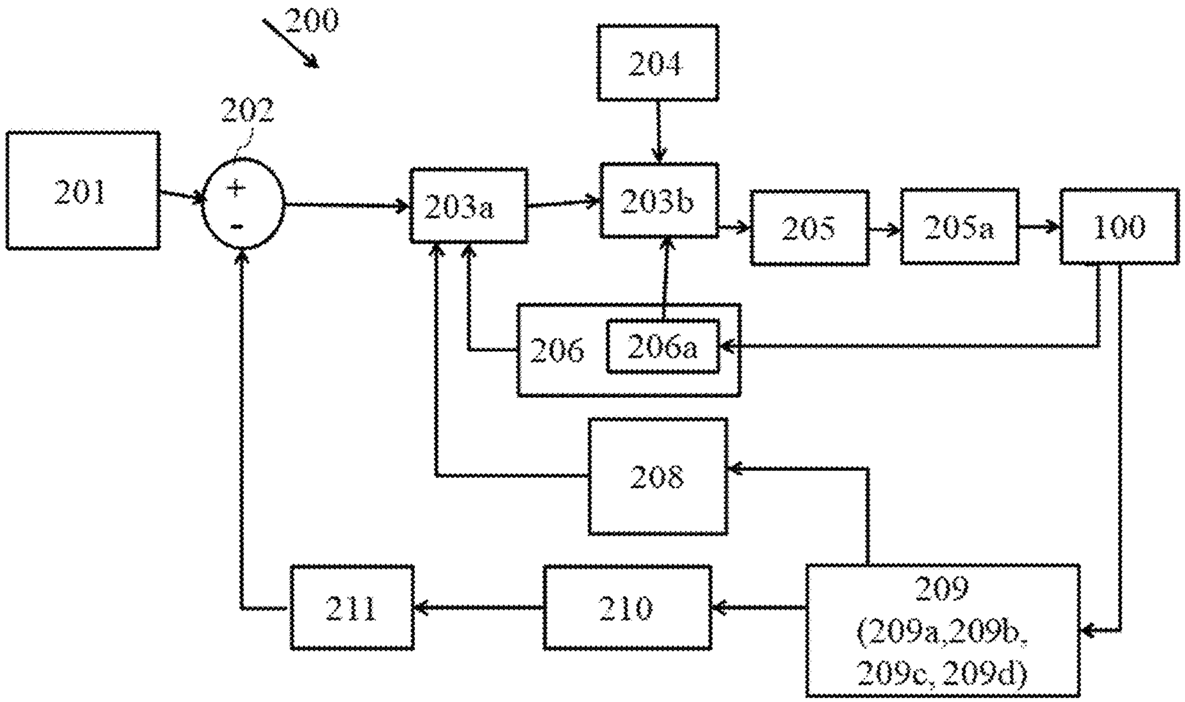
FIG. 3 illustrates a stabilization control system according to a second embodiment of the present subject matter.

FIG. 3 illustrates a stabilization control system according to a second embodiment of the present subject matter. In the second embodiment, the self-stabilization control unit 203 includes a vehicle input processing module **203*a* and an actuator input processing module 203*b*. The vehicle input processing module 203*a* is configured to receive inputs from an actuator angle processing unit 206. The actuator angle processing unit 206 is configured to include an actuator angle position sensor 206*a*. In addition, the actuator angle processing unit 206 also performs the functionality of keeping a check on the angular position of the actuator 205. After the maximum angular position of the actuator 205 is achieved, the data is sent to the vehicle input processing unit 203*a*. The vehicle input processing unit 203*a* at this instance, does not allow further actuation of the actuator driver 205 stemming further actuation of the actuator 205***a*.

The vehicle input processing module 203*a* is configured to consider an input from the actuator angle processing unit 206 as input. In addition, an input from a pre-determined actuator angle unit 204 is considered, which is always 0. If the actuator 205*a* tends to move more than a maximum angle, then the vehicle input processing module 203*a* provides zero signal to the actuator input processing module 203*b*. Additionally vehicle input processing module 203*a* is configured to consider the roll angle data and provide the data to the actuator input processing module 203*b*. Further, the actuator input processing module 203*b* processes the actuator angle as well as the input from vehicle input processing module 203*a* and provides a calculated signal to the actuator driver 205 at each speeds of the vehicle 100. This in turn exerts a reaction force on the vehicle 100. This makes the real time roll angle of the two-wheeler to change as soon as the roll angle of the vehicle changes in the vehicle 100. The one or more sensors 209 of the vehicle 100 detect the instantaneous roll angle of the vehicle and the roll angle data processing unit 201 provides an estimation of the desired roll angle data, which is compared by a comparator 202 to provide, the positive or negative difference between the two angles as the case may be, to the vehicle input processing module 203*a* of the self-balancing control unit 203. In parallel, the actuator angle position sensor 206*a* provides actuator angle position feedback to the actuator input processing module 203*b*.

An almost instantaneous feedback is required to balance a heavy system like a two-wheeler. This is achieved by the proposed stabilization control system in the vehicle.

Figure 4:
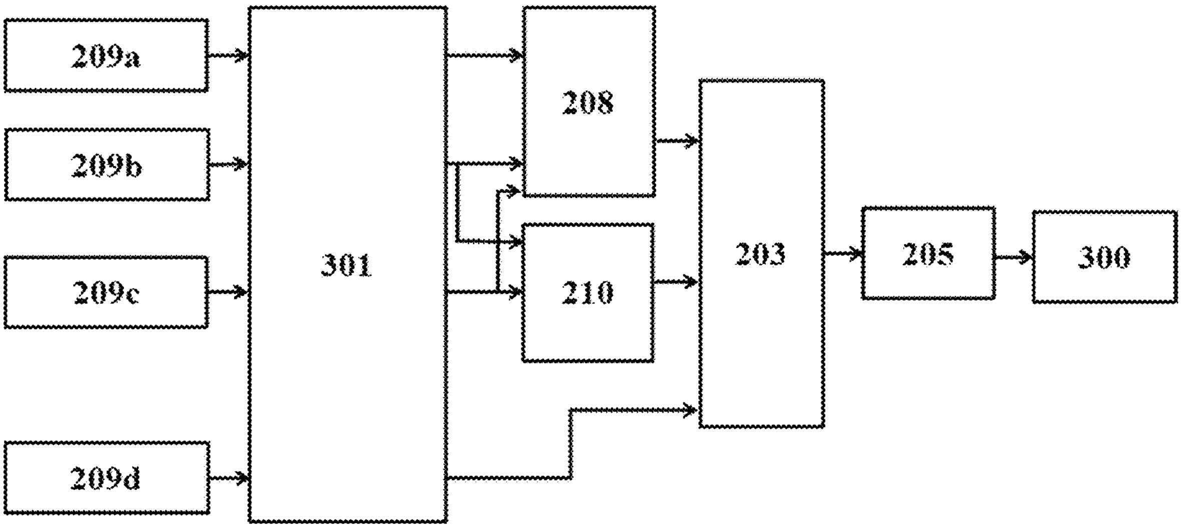
FIG. 4 illustrates a flow-diagram of working of different modules in the stabilization control system.

FIG. 4 illustrates a flow-diagram of working of different modules in the stabilization control system. The different modules include data acquisition and processing module 301 for processing each of the inputs received from the one or more sensors 209 comprising one or more of a suspension stroke sensor 209*a*, one or more accelerometers 209*b*, one or more roll angle sensors 209*c*, and one or more actuator angle position sensors 209*d*.

In an embodiment, the different modules include independent data acquisition and processing module 301 for processing each of the inputs received from the suspension stroke sensor 209*a*, one or more accelerometers 209*b*, one or more roll angle sensors 209*c*, and one or more actuator angle position sensors 209*d*.

The independent data acquisition and processing module 301 collects data from the one or more sensors 209 and filters the unwanted noise. The modules being independent allows the control system 200 to collect all the data inputs from the one or more sensors 209 at the same time reducing the latency in the system, making system almost instantaneous. Also, the delay in a single sensor does not affect other sensor inputs. The data acquired from the one or more accelerometers 209*b* and actuator angle position sensor 209*d* is then fed to a roll angle data processing module 210, this is also an independent module. The roll angle data processing module 210 collects the latest data from the accelerometers 209*b* and actuator angle position sensor 209*d* and is configured to determine the roll angle data of the vehicle at that particular real time. The roll angle data processing module 210 collects the angle value from one or more accelerometers 209*b* and the actuator angle position sensor 209*d* independently. The one or more accelerometers 209*b* data is prone to noise while the actuator angle positions data is prone to drift. These values are used to predict the actual roll angle using a Bayesian updating principle. The actuator angle data from the data acquisition and processing unit of the actuator angle position sensor 209*d* is provided to the self-stabilizing control unit 203.

Further, the inputs detected by the one or more roll angle sensors 209*c* is sent out of the data acquisition and processing module 301 and given as inputs to the roll angle data unit 210. The roll angle data unit 210 is configured to process the received inputs from the one or more roll angle sensors 209*c* and provide it to the self-stabilizing control unit 203 for further processing. The data of the speed of the vehicle, as provided by one or more accelerometers 209*b* is considered by the roll angle data processing unit 210 before providing the roll angle data to the self-stabilizing control unit 203. The speed of the vehicle, as detected by the one or more accelerometers 209*b*, the roll angle data as detected by the one or more roll angle sensors 203*c*, and the suspension stroke sensors are the required data for processing by the rider condition sensing unit The self-stabilizing control unit 203 also takes in the roll angle data from the roll angle data processing module 208. Using both data the self-stabilizing control unit 203 ensures that the vehicle is stabilized as well as the actuator angle does not drift away from its mean position. The self-stabilizing control unit 203 then estimates and provides the PWM value to the actuator driver 205 and the actuator 205*a* provides the required actuation, which in turn provides the balancing torque in the vehicle 100.

Further, the actuator angle position inputs from the actuator angle position sensor 209*d* is also provided to the actuator input processing module 203*b* (part of self-stabilizing control unit 203). The actuator input processing module 203*b* is another comparator, which compares the actuator angle position sensor 209*d* inputs with a desired actuator angle input. In an embodiment, the desired actuator angle input is always 0. Therefore, the actuator input processing unit 203*b* after considering the functionalities and outputs of the vehicle input processing module 203*a*, provides required input to the actuator driver 205.

Figure 5A:
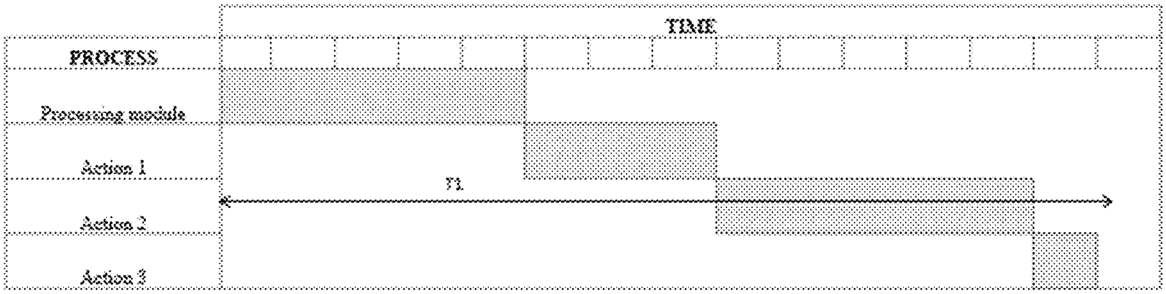
FIG. 5*a* illustrates a graphical representation of total time consumed by the stabilization control system through conventional processing.

FIG. 5*a* illustrates a graphical representation of total time consumed by the stabilization control system through conventional processing. The conventional processing includes processing of each module in the system in a series manner. That is, the processing of modules is taken one at a time. As illustrated in the figure, the system first allows only the vehicle input processing module to perform its functionalities, until then, the other module functionalities are in the pipeline. Because of which the time taken per cycle is T1 seconds. In a system which is expected to perform such various actions 'n' number of times, such a conventional long-time duration processing of modules one after the other is not desirable. As the response time take to enable the actuator 205*a* is delayed to a considerable extent, because of which quick response in stabilizing the vehicle is not achieved.

Figure 5B:
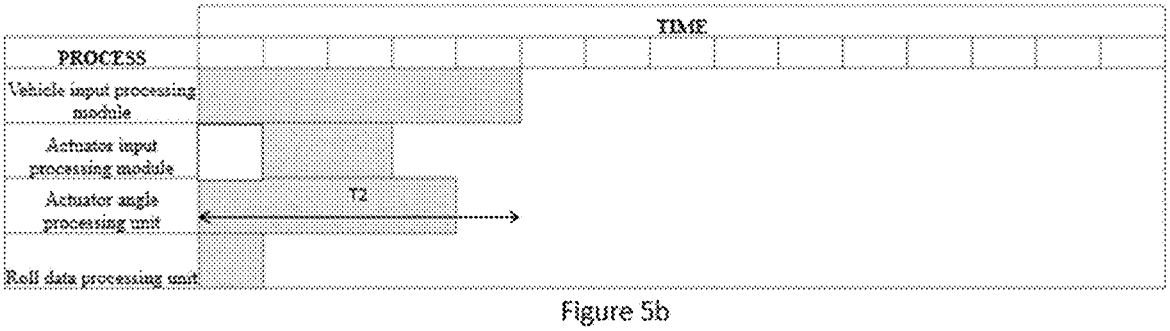
FIG. 5*b* illustrates a graphical representation of total time consumed by the stabilization control system as per the present subject matter.

FIG. 5*b* illustrates a graphical representation of total time consumed by the stabilization control system as per the present subject matter. According to the present subject matter, the stabilization control system allows processing of the vehicle input processing module, actuator input processing module, actuator angle processing, and roll data processing unit simultaneously. Once, the processing of the vehicle input processing module begins, the processing of other modules by receiving respective inputs is performed simultaneously. The output response torque produced after enabling of the actuator 205*a* is quick compared to the conventional processing as shown in FIG. 5*a*. Therefore, the stabilization of the vehicle is achieved quickly. The stabilization includes bringing the vehicle into upright position. The user of the vehicle is not put to any discomfort in experiencing the stabilization of the vehicle that is taking place. The same is achieved as a result of quick response, with a shorter cycle time per cycle T2 s provided by the system in order to achieve the stabilization of the vehicle. As per an aspect of the present invention, T2 is <=0.4T1 where the T1 seconds is a time taken for enabling stabilization of the saddled vehicle by processing data inputs from the one or more vehicle sensors one at a time.

Figure 6:
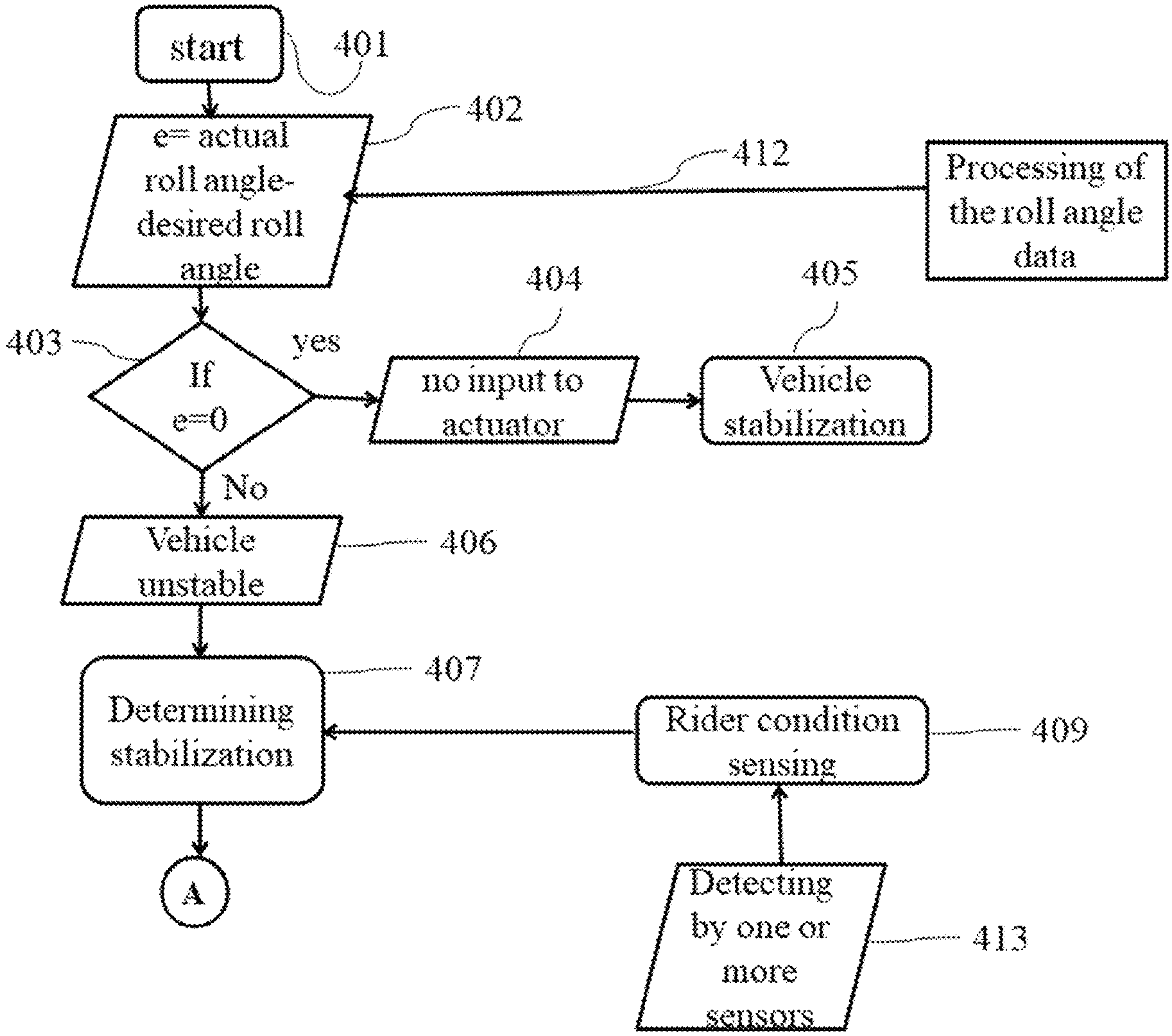
FIG. 6 illustrates a flow diagram of a method to control the stabilization control system as provided in the FIG. 2.

FIG. 6 illustrates a flow diagram of a method to control the stabilization control system as provided in the FIG. 2.

According to an embodiment of the present invention, a method for the stabilization control system 200, the method comprising the steps of:

Initializing the stabilization of the control system 200 as indicated at step 401. After initializing the system 200, the functionality of the comparator 202 of comparing a desired roll angle data received from a vehicle roll angel data unit 201 and a feedback roll angle data received from a feedback roll angle data unit 210 occurs as indicated at step 402. Further, after receiving inputs, the process of determining a difference ‘e’ roll angle data between the received inputs takes place as indicated by a step 403. After which, if the difference e=0 at step 403, the self-stabilization control unit 203 does not provide any inputs to the actuator driver 205 at step 404. Therefore, the functionality of not enabling the actuator driver 205 if said difference roll angle data is 0, resulting in a stabilized vehicle 405 takes place.

Further, the self-stabilization control unit 203, provides inputs to the actuator driver 205, else if the difference roll angle data is not 0, then the difference roll angle data as indicated at step 406 for determining stabilization as indicated at step 407 is provided for enabling said actuator driver 205. The actuator driver 205 enables an actuator 205*a* for stabilizing the vehicle as indicated by step 409. The inputs are received from the one or more sensors as indicated at step 413.

According to an embodiment of the present invention, the method for a stabilization control system 200 comprises the step of providing sensed inputs from the actuator position sensor 206*a* as indicated at step 410*a* for determining stabilizing 407 of the vehicle as indicated at step 410.

According to an embodiment of the present invention, the method for a stabilization control system 200 comprises the step 411 of receiving an output reaction torque by one or more sensors 209 as indicated at step 411. The output reaction torque at step 411 and output of one or more sensors 209 is received by a feedback roll angle data unit 210 and at step 412 and the output of one or more sensors 209.

According to an embodiment of the present invention, the method for a stabilization control system 200 comprises the step of providing rider condition inputs detected by rider condition sensor as indicated at step 414 for determining stabilization as indicated by step 407.

The system provides a cost effective, compact, instantaneous as well as efficient way to provide stabilization to a two-wheeler with low cost sensors. The system has low latency and instantaneously corrects the two-wheeler from any deviance from the mean position. This makes the stabilization of a real sized two-wheeler possible.

It is to be understood that the aspects of the embodiments are not necessarily limited to the features described herein. Many modifications and variations of the present subject matter are possible in the light of above disclosure.

We claim:

1. A stabilization control system for a saddled vehicle, the stabilization control system comprising:

a controller that:

obtains a predetermined roll angle of the saddled vehicle from a steering lean angle sensor and a vehicle speed sensor, detects, with a comparator, a difference roll angle data between the predetermined roll angle and an input from vehicle sensors coupled to the saddled vehicle, and controls an actuator driver that drives an actuator connected to the saddled vehicle based upon the difference roll angle data, wherein the vehicle sensors include a suspension stroke sensor, one or more accelerometers, and an actuator angle position sensor, and the controller further:

simultaneously collects and processes inputs from the vehicle sensors, estimates a real-time roll angle by combining inputs from the one or more accelerometers and the actuator angle position sensor using a Bayesian updating technique to compensate for sensor noise and drift, detects, with the suspension stroke sensor, a stroke length of a suspension assembly of the saddled vehicle to determine whether a single rider is seated or the rider along with a pillion rider is seated on the saddled vehicle, and determines whether an output reaction torque provided by the actuator is sufficient for the single rider or a sufficient output reaction torque needs to be produced, depending on presence or absence of a weight of the pillion rider.

2. The stabilization control system as claimed in claim 1, wherein the actuator is configured to provide an output reaction torque and enable stabilization of the saddled vehicle.

3. The stabilization control system as claimed in claim 1, wherein the vehicle sensors further include one or more lean angle sensors.

4. The stabilization control system as claimed in claim 1, wherein the controller further:

receives an input from an actuator position sensor mounted on the saddled vehicle, and detects an actuator angle and determine a maximum angle attained by the actuator.

5. The stabilization control system as claimed in claim 1, wherein the controller further receives inputs from an actuator position sensor mounted on the saddled vehicle and from a pre-determined actuator angle sensor.

6. A stabilization control system for a saddled vehicle, the stabilization control system comprising:

a controller that:

obtains a predetermined roll angle of the saddled vehicle from a steering lean angle sensor and a vehicle speed sensor, detects, with a comparator, a difference roll angle data between the predetermined roll angle and an input from vehicle sensors coupled to the saddled vehicle, and receives an input from an actuator position sensor mounted on the saddled vehicle and an input from a pre-determined actuator angle sensor, wherein the vehicle sensors include a suspension stroke sensor, one or more accelerometers, and an actuator angle position sensor, and the controller further:

simultaneously collects and processes inputs from the vehicle sensors, estimates a real-time roll angle by combining inputs from the one or more accelerometers and the actuator angle position sensor using a Bayesian updating technique to compensate for sensor noise and drift, detects, with the suspension stroke sensor, a stroke length of a suspension assembly of the saddled vehicle to determine whether a single rider is seated or the rider along with a pillion rider is seated on the saddled vehicle, and determines whether an output reaction torque provided by the actuator is sufficient for the single rider or a sufficient output reaction torque needs to be produced, depending on presence or absence of a weight of the pillion rider.

7. The stabilization control system as claimed in claim 6, wherein the controller is configured to determine an actuator angle based on the input from the actuator position sensor and determine whether the angle attained by the actuator is a predetermined maximum angle permissible angle.

8. A method for a stabilization control system, the method comprising:

initializing the stabilization control system;

comparing, with a comparator, a desired roll angle data initially input to the stabilization control system and a feedback roll angle data received from vehicle sensors coupled to a saddled vehicle;

determining a difference in the roll angle data;

identifying that the saddled vehicle is stable if there is no difference in the roll angle data; and identifying that the saddled vehicle is unstable due to the difference in the roll angle data and stabilizing the saddled vehicle, wherein the vehicle sensors include a suspension stroke sensor, one or more accelerometers, and an actuator angle position sensor, and the method further comprises:

simultaneously collecting and processing inputs from the vehicle sensors, estimating a real-time roll angle by combining inputs from the one or more accelerometers and the actuator angle position sensor using a Bayesian updating technique to compensate for sensor noise and drift, detecting, with the suspension stroke sensor, a stroke length of a suspension assembly of the saddled vehicle to determine whether a single rider is seated or the rider along with a pillion rider is seated on the saddled vehicle, and determining whether an output reaction torque provided by the actuator is sufficient for the single rider or a sufficient output reaction torque needs to be produced, depending on presence or absence of a weight of the pillion rider.

9. The method for the stabilization control system as claimed in claim 8, wherein the difference in the roll angle data for determining stabilization is provided for controlling an actuator driver that enables an actuator connected to the saddled vehicle for stabilizing the saddled vehicle.

10. The method for the stabilization control system as claimed in claim 9, further comprising:

providing an input from an actuator position sensor mounted on the saddled vehicle for determining stabilizing.

11. The method for the stabilization control system as claimed in claim 9, further comprising:

receiving an output reaction torque by one or more sensors; and providing feedback from the output reaction torque and outputs of the one or more sensors to the comparator for determining the difference.

12. A stabilization control system for a saddled vehicle, the stabilization control system comprising:

a controller that:

obtains a predetermined roll angle of the saddled vehicle from a steering lean angle sensor and a vehicle speed sensor, detects, with a comparator, a difference roll angle data between the predetermined roll angle and an input from vehicle sensors coupled to the saddled vehicle, and controls an actuator driver that drives an actuator connected to the saddled vehicle based upon the difference roll angle data; and a filter that filters data received from the vehicle sensors to remove unwanted data, wherein the vehicle sensors include a suspension stroke sensor, one or more accelerometers, and an actuator angle position sensor, and the controller further:

simultaneously collects and processes inputs from the vehicle sensors, estimates a real-time roll angle by combining inputs from the one or more accelerometers and the actuator angle position sensor using a Bayesian updating technique to compensate for sensor noise and drift, detects, with the suspension stroke sensor, a stroke length of a suspension assembly of the saddled vehicle to determine whether a single rider is seated or the rider along with a pillion rider is seated on the saddled vehicle, and determines whether an output reaction torque provided by the actuator is sufficient for the single rider or a sufficient output reaction torque needs to be produced, depending on presence or absence of a weight of the pillion rider.

13. The stabilization control system as claimed in claim 12, wherein the controller enables stabilization in T2 seconds where T2 is <=0.4 T1 seconds where the T1 seconds is a time taken for enabling stabilization of the saddled vehicle by processing data inputs from the vehicle sensors one at a time.

* * * * *